US007451016B2

(12) United States Patent
Johannessen et al.

(10) Patent No.: US 7,451,016 B2
(45) Date of Patent: *Nov. 11, 2008

(54) INDUSTRIAL ROBOT COMPRISING A PORTABLE OPERATING UNIT WHICH A MOVABLE KEY DEVICE FOR IDENTIFICATION OF THE ROBOT

(75) Inventors: Svein Johannessen, Oslo (NO); Jan Endresen, Asker (NO); Erik Carlson, Nesoddtangen (NO)

(73) Assignee: ABB AB, Västerås (SE)

(*) Notice: Subject to any disclaimer, the term of this patent is extended or adjusted under 35 U.S.C. 154(b) by 808 days.

This patent is subject to a terminal disclaimer.

(21) Appl. No.: 10/473,743

(22) PCT Filed: Apr. 2, 2002

(86) PCT No.: PCT/SE02/00645

§ 371 (c)(1), (2), (4) Date: Mar. 8, 2004

(87) PCT Pub. No.: WO02/078914

PCT Pub. Date: Oct. 10, 2002

(65) Prior Publication Data

US 2004/0148058 A1 Jul. 29, 2004

(30) Foreign Application Priority Data

Apr. 2, 2001 (SE) .................................... 0101200

(51) Int. Cl.

| | |
|---|---|
| ***G06F 19/00*** | (2006.01) |
| *H04Q 5/22* | (2006.01) |
| *G05B 19/00* | (2006.01) |
| *G05B 23/00* | (2006.01) |
| *B25J 9/18* | (2006.01) |
| *B25J 9/22* | (2006.01) |

(52) U.S. Cl. ....................... 700/245; 700/260; 700/250; 700/255; 700/61; 700/83; 340/10.1; 340/10.51; 340/10.52; 340/10.5; 340/10.42; 318/568.11; 318/568.12; 318/568.13; 318/567; 318/569; 180/2.1; 701/207

(58) Field of Classification Search ............ 318/568.11, 318/568.12, 567, 569, 568.1, 568.15; 340/10.1, 340/10.51, 10.52, 10.5, 10.42, 5.5, 5.51, 340/5.6; 901/3, 4, 6, 8, 9, 46

See application file for complete search history.

(56) References Cited

U.S. PATENT DOCUMENTS 4,611,296 A * 9/1986 Niedermayr ................ 700/260

(Continued)

FOREIGN PATENT DOCUMENTS

| | | |
|---|---|---|
| DE | 19536293 | 1/1997 |
| EP | 0536417 | 4/1993 |
| EP | 0924034 | 6/1999 |
| EP | 0940739 | 9/1999 |

*Primary Examiner*—Khoi H. Tran
*Assistant Examiner*—Ian Jen
(74) *Attorney, Agent, or Firm*—Venable LLP; Eric J. Franklin

(57) ABSTRACT

An industrial robot system including a plurality of industrial robots. Each robot includes a manipulator, a control unit for automatically operating the manipulator, and a movable key device configured to store information about the identity of the robot to which the moveable key device belongs. A portable operating unit is configured to teach and program the robots. The portable operating unit is adapted for wireless communication with each control unit. The portable operating unit includes a member for receiving one of the moveable key devices, a reader for reading a robot identity from the received moveable device, and a communication establisher for establishing wireless communication between the operating unit and the control unit of the identified robot upon reading the robot identity from the moveable key device.

22 Claims, 3 Drawing Sheets

9 1 5 4 7 8 6 10 16 2 3 13 14 15

U.S. PATENT DOCUMENTS 4,888,708 A * 12/1989 Brantmark et al. .......... 700/264
5,404,290 A * 4/1995 Tsuchihashi et al. .......... 700/61
5,532,675 A * 7/1996 White ........................ 340/515
5,819,008 A * 10/1998 Asama et al. ............... 700/255
5,991,510 A * 11/1999 Beaulieu ..................... 700/250
6,218,802 B1 * 4/2001 Onoue et al. ........... 318/568.13
6,362,813 B1 3/2002 Wörn et al.
6,374,156 B1 * 4/2002 Shimogama et al. ........ 700/245
6,529,785 B1 * 3/2003 Keeley ........................ 700/83
6,697,681 B1 * 2/2004 Stoddard et al. .............. 700/17
2004/0260426 A1 * 12/2004 Johannessen et al. ....... 700/245

* cited by examiner

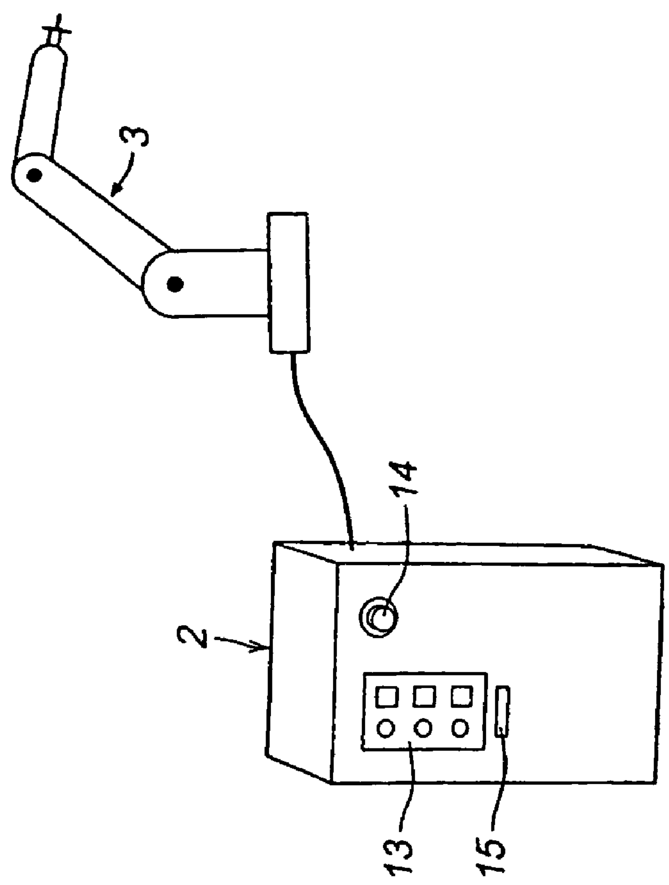
Fig. 1
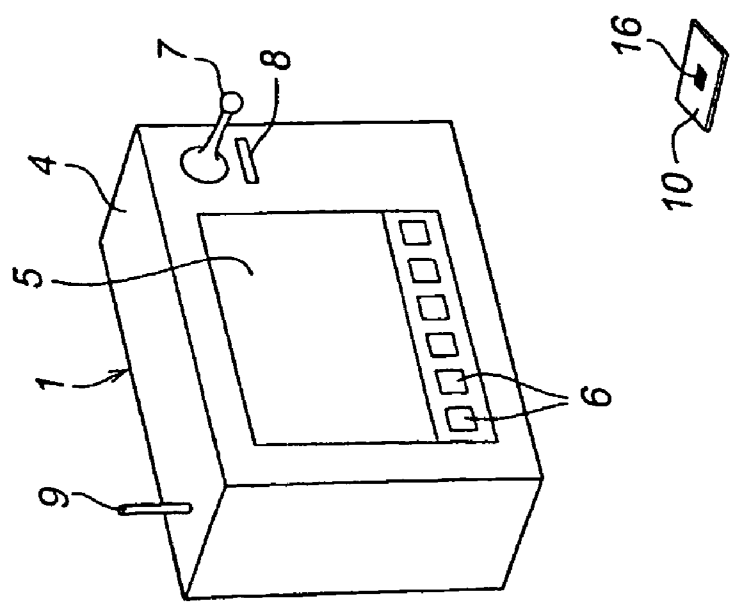

INDUSTRIAL ROBOT COMPRISING A PORTABLE OPERATING UNIT WHICH A MOVABLE KEY DEVICE FOR IDENTIFICATION OF THE ROBOT

FIELD OF THE INVENTION

The present invention relates to an industrial robot comprising a manipulator, a control unit having means for automatically operating the manipulator, and a portable operating unit having means for manually operating the manipulator.

The present invention also relates to an industrial robot system comprising a plurality of industrial robots each having a manipulator and a control unit having means for automatically operating the manipulator, and at least one portable operating unit for teaching and programming the manipulators, which portable operating unit is adapted for wireless communication with the control units.

The present invention further relates to an operating unit for an industrial robot having a specified identity, a manipulator and a control unit for controlling the manipulator, the operating unit comprising means for manually operating the manipulator and means for communicating with the control unit.

The present invention further relates to a method for controlling an industrial robot, comprising a manipulator and a control unit for controlling the manipulator, with a portable operating unit for teaching and manually operating the manipulator.

The invention also relates to the use of an industrial for operation control at a spot welding station.

A movable operating unit is generally denoted a teaching pendant, and is used for manually controlling the robot, for example to teach or program the robot to follow an operating path.

PRIOR ART

Robots are used to carry out repetitious and precise tasks, such as welding and painting of components. The robots are programmed to carry out a work or a work cycle along an operating path. In order to program or teach the robot its working cycle, the robot is manipulated to various positions along the desired operating path. These positions are stored as instructions in a memory in the control unit. Other information, such as desired robot movement velocity, may also be stored in the memory. During operation of the robot, the program instructions are executed, thereby making the robot operate as desired.

Various devices used to facilitate the programming of robots are known in the art. For example U.S. Pat. No. 4,888,708 issued to Brantmark et al discloses a portable teach pendant, for teaching and manually operating the robot, by use of a joystick, a keyboard, and a visual display unit. The keyboard has various function keys which permit an operator to select different states for the control system. The teach pendant may for example be used for monitoring the robot program, changing certain variables in the program, starting, stopping and editing the program, and for manually moving the manipulator by use of the joystick. The operator is teaching the robot while watching the motion of the manipulator.

A robot can be operated in at least two modes: automatic and manual. The choice of mode, in which the robot shall operate, is made by switching a mode selector key on a control panel on the control unit. When the robot is in the manual mode, the teach pendant has the exclusive right to operate the robot and thus no other operating units are allowed to control the robot.

When the robot is in the automatic mode, some of the functions in the teach pendant are blocked, for example the functioning of the joystick.

The teach pendant disclosed in the above mentioned U.S. patent is connected to the control unit via a flexible cable or wire. There are many problems related to having a cable between the control unit and the teach pendant, particularly when there are several robots arranged near each other in a robot line. The cable between the teach pendant and the control unit has to be rather long and the risk for twisting the cables of the robots is considerable. Neighboring robots could also have their cables twisted with each other and thus it is sometimes difficult to know to which robot a certain teach pendant belongs. There is also a risk for breakage of the cables resulting in loss of communication between the teach pendant and the control unit.

From the German patent No. DE 195 36 293 it is known to use a wireless link for exchange of information between the teach pendant and the robot. One advantage with a wireless connection between the robot and the teach pendant is the possibility of using the same teach pendant for several robots. Accordingly, the teach pendant does not belong to a certain robot, and may be used together with any of the robots in a robot cell.

Robots are usually placed in robot cells in order to facilitate the automation of a complex series of actions. When one of the robots in a robot cell is to be placed under manual control using a wireless teach pendant, it is important that the teach pendant is communicating with and controlling the correct robot. It must be possible to ensure correct association between the wireless teach pendant and the control unit. Otherwise, there is a risk for personal injury, should the operator believe that he is operating a certain robot but is instead operating another robot in the cell. Thus, a problem arising when using a teach pendant not physically connected with the robot, is how to ensure that the correct robot is connected with the teach pendant.

Another problem with wireless communication between the robot and the teach pendant is the functioning of the emergency stop button on the teach pendant when the teach pendent is not connected with any robot. For safety reasons it is required that a visible emergency stop button stops the robot at any time the button is pushed. Accordingly, the teach pendant is not allowed to have a visible emergency stop button when it is not connected to any of the robots.

SUMMARY OF THE INVENTION

The object of the present invention is to provide an industrial robot having a portable operating unit which overcomes the problems mentioned above and in particular the problem to ensure that the correct robot is connected with the portable operating unit.

This object is achieved by means of the initially defined industrial robot, characterised in that device, characterised in that it comprises a movable key device carrying information about the identity of the robot and said portable operating unit comprising a member for receiving said movable key device and means for reading the robot identity from the key device. The key device is provided with information about the identity of the robot to which the operating unit shall be connected. By physically moving the key device to the operating unit, and transferring the robot identification to the operating unit, it is possible to ensure that the operating unit knows which robot it shall be connected to. If the operating unit is connected to the robot through a cable, it is possible to compare the identity from the key with the identity of the connected robot. If the identities are identical, the operating unit are enabled for operation, otherwise the operating unit is blocked from operation.

According to a further embodiment of the invention, the portable operating unit and the control unit are adapted for wireless communication with each other. The invention is particularly useful in connection with a wireless operating unit. For ensuring that the operating unit is associated with a certain robot, having a specific identity, the identification of the robot is transferred to the operating unit by physically moving the key device to the operating unit. Accordingly, it is possible to ensure correct association between the wireless operating unit and the robot.

According to an embodiment of the invention, the robot comprises a second member for receiving the movable key device and said second receiving member being located at or in connection with the control unit of the robot. While the robot is not operated by the operating unit, the key device is returned to the robot, preferably to the controller or to a location close to the controller. Thus, it is easy for an operator to visually notice to which robot the key device belongs and mistakes due to the operator taking the wrong key device are prevented.

According to a further embodiment of the invention, the portable operating unit comprises means for displaying the identity of the robot. To further prevent mistakes due to uncertain identification of which robot the operating unit is operating at the moment, the identity of the robot associated with the operating unit is displayed on the operating unit.

According to a further embodiment of the invention, the portable operating unit comprises means for sensing the presence of the key device and means for enabling manual operation of the manipulator in presence of the key device in the operating unit. The control unit comprises means for sensing the presence of the key device and means for enabling automatic operation of the manipulator in presence of the key device. In this embodiment the key device can also functions as a switch between automatic and manual mode of operation of the robot. By moving the key device to the operating unit, the robot is brought to operate in the manual mode and by moving the key device back to the controller the robot is brought to operate in the automatic mode.

According to a further embodiment of the invention, the portable operating unit comprises means for establishing a communication with the control unit of the identified robot. A communication between the operating unit and the control unit of a robot can be established as soon as the operating unit has received information about the identity of the robot to which it shall be associated. Since the identification of the robot is transferred by the key device, no communication could be established until the key device is present in the operating unit. Accordingly, when a communication is established with the control unit, the control unit knows that the operating unit has received the key device.

According to a further embodiment of the invention, the communication between the portable operating unit and the control unit is carried out via a base station and the movable key device is adapted for carrying information about the address of the base station. To facilitate the establishment of the communication between the portable operating unit and the control unit, the address of the base station is transferred to the operating unit through the key device. For a robot cell, having several robots connected to a base station, the number of key devices could be the same as the number of robots in the cell. The key devices will all have the same base station address, but different robot identities.

According to a further embodiment of the invention the control unit comprises means for measuring the time elapsed between the point of time when the key unit is removed from the second receiving member until communication is established between the portable operating unit and the control unit. Preferably, the control unit comprises means for comparing said time with a predetermined maximum time and for emergency stopping the manipulator depending on said comparison. For the purpose of detecting a loss of the key device, a timer is started upon removal of the key device from the control unit. The timer is stopped when the key device is received by the operating unit and the communication is established. If the time exceeds a predetermined maximum time, an emergency stop of the robot is executed.

According to a further embodiment of the invention, the control unit comprises means for determining whether the key device received by the second receiving member carries the same identification as the robot. A problem associated with having a movable key device is the risk for returning the key device to the wrong robot. This problem is solved by providing the control unit with means for checking the identity of a received key device.

According to a further embodiment of the invention, the key unit comprises an emergency stop button. With a movable key device provided with an emergency stop button, it is ensured that the operating unit will always have a working emergency stop button when the robot is controlled by the operating unit.

According to a further embodiment of the invention, the movable key device comprises an electronic hardware device, for example an information storage device. According to a further embodiment of the invention, the movable key device comprises a processor.

According to a further embodiment of the invention, the control unit comprises means for detecting lack of robot identity in the key device and means for transferring the identity of the robot to the key device. Preferably, the control unit also comprises means for detecting lack of robot identity in the control unit itself and means for transferring the identity of the robot from the key device to the control unit.

A further object of the invention is to provide an industrial robot system having a plurality of robots and at least one wireless operating unit which could operate anyone of the robots, if correctly associated with it, which robot system overcomes the problems mentioned above and in particular the problem in connection with the functioning of the emergency stop button.

Another object of the invention is to provide a portable operating unit overcoming the problem to ensure that it is connected with a certain robot, having a specified identity.

Another object of the invention is to provide a method for controlling an industrial robot with a portable operating unit, which method solves the problem to ensure that the correct robot is connected with the portable operating unit.

Many of the above mentioned means are effectuated by software instruction run on a processor in the operating unit or a processor in the control unit.

BRIEF DESCRIPTION OF THE DRAWINGS

The invention will now be explained more closely by the description of different embodiments thereof and with reference to the appended drawings.

FIG. 1 is a perspective view of an industrial robot according to one embodiment of the invention, comprising an operating unit adapted for wireless communication with a control unit of the robot.

DETAILED DESCRIPTION OF PREFERRED EMBODIMENTS OF THE INVENTION

Figure 2:
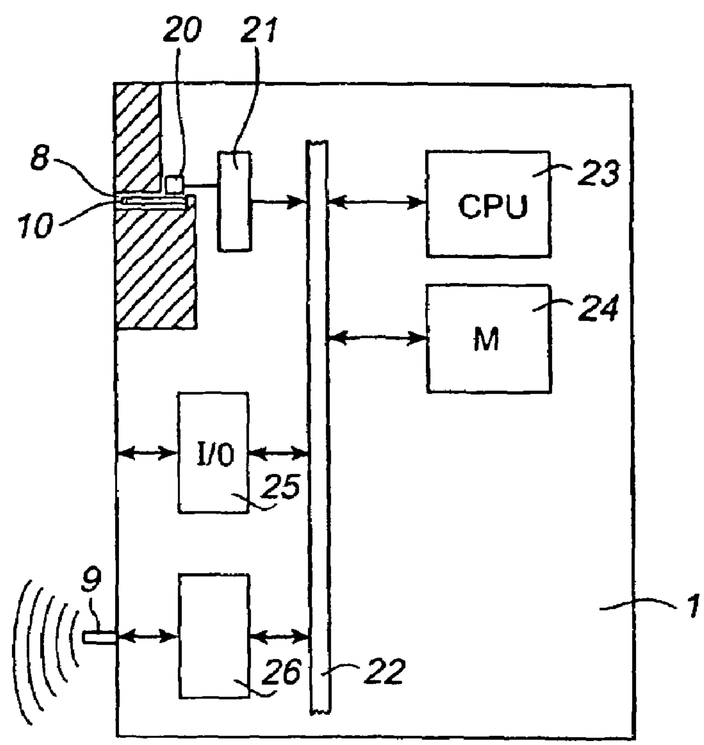
FIG. 2 is a block diagram of the operating unit according to one embodiment of the invention.

FIG. 1 shows an industrial robot according to the invention, comprising a portable operating unit 1 and a control unit 2 coupled for transmitting data via a communication cable or a link to a manipulator 3. The operating unit and the control unit are adapted for radio communication with each other. The control unit 2 is capable of processing and outputting data received from the operating unit. The operating unit 1 comprises a body 4, a display screen 5, a set of function keys 6, and a joystick 7. The function keys 6 permit an operator to select various states for the control system. The joystick is used for controlling the movement of the manipulator when the robot is manually operated and could be used as a mouse. The operating unit 1 further comprises an antenna 9 for radio communication with the control unit 2 and a slot 8 adapted for receiving a key device 10. In this embodiment of the invention the key device is a card having an electronic hardware device 16 including a memory or a register adapted for storing information about the identity of the robot, to which the key device belongs. The control unit 2 comprises an operator panel 13 having keys for setting the control unit, an emergency stop button 14 and an slot 15 adapted for receiving the key device 10.

FIG. 2 shows the operating unit 1 having received the movable key device 10 through the slot 8. A sensor member 20, positioned inside the operating unit 1, is adapted for sensing the presence of the key device 10 in the operating unit 1 and reading the information about the robot identity from the hardware device 16. This information is transmitted via a bus interface 21 to a data bus 22. The operating unit 1 further comprises a processing unit 23 adapted for processing data programs for controlling the function of the operating unit, a memory 24 for storing the data programs and the information about the robot identity, interface means 25 for coupling input and output signals between the data bus 22 and the display screen 5, the function keys 6 and the joystick 7, and a coupling element 26 for converting and coupling data between the antenna 9 and the data bus 22.

Figure 3:
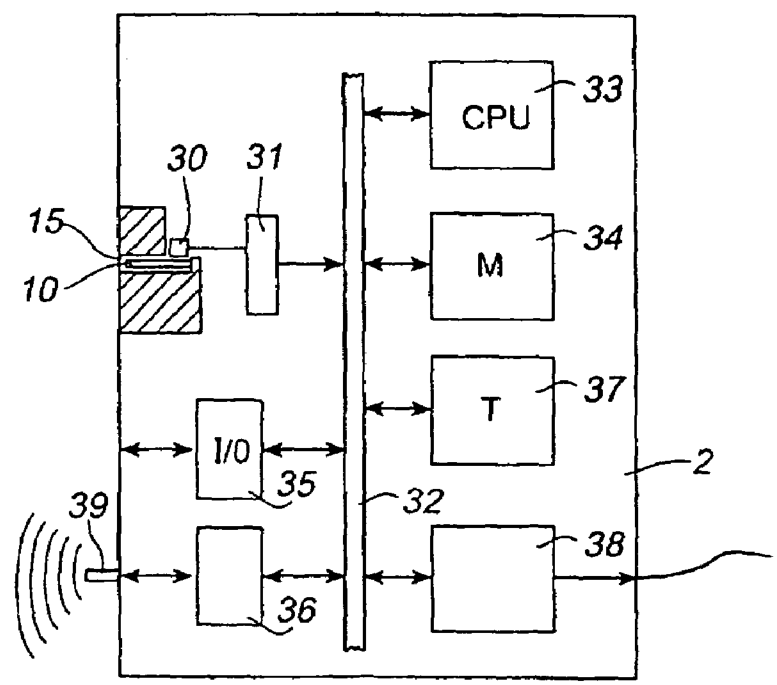
FIG. 3 is a block diagram of the control unit of an industrial robot according to one embodiment of the invention.

FIG. 3 shows the control unit 2 having received the movable key device 10 through the slot 15. A sensor unit 30 is adapted for sensing the presence of the key device 10 in the control unit 2 and reading the information about the robot identity from the hardware device 16 to the data bus 32 via a bus interface 31. The control unit 2 further comprises a processing unit 33, a memory 34 for storing data programs and parameters, a first interface means 35 for transmitting input and output signals between the data bus 32 and the operator panel 13, a coupling element 36 for converting and coupling data between an antenna 39 and the data bus 32, and a second interface means 38 for transmitting data and control signals between the data bus 32 and the manipulator. The control unit 2 also includes a timer unit 37, discussed below.

When the operating unit 1 is not used, the key device 10 is positioned in the control unit 2. If an operator decides to use the operating unit, he moves the key device 10 to the operating unit 1. The sensor member 20 senses the presence of the key device 10 and reads the information about the robot identity from the hardware device 16 and transmits it, to the processor unit 23 via the data bus 22. When the processor unit has received the information about the robot identity, it establishes a radio contact with the control unit 2 of the identified robot via the coupling element 26 and the antenna 9.

When the operating unit 1 is not to be used, the key device 10 is returned to the control unit 2 and remains there until the next time the operating unit 1 is to be used. When the sensor member 30 in the control unit 2 has sensed the presence of the key device 10, it transmits the information about the robot identity from the hardware device 16, via the data bus 32, to the processor unit 33. When the processor unit 33 has received the information about the robot identity, it compares it with a stored robot identity, for the purpose of checking that the received key device is the correct one, belonging to the robot. If the identities are not the same, the control unit will not accept receiving the key device and will generate an alarm signal.

For the purpose of detecting a loss of the key device 10, the timer unit 37 is started when the key device 10 is removed from the control unit 2 and is stopped when the key device is received by the operating unit 1 and the communication is established. When the timer runs out, i.e. when the time elapsed exceeds a predetermined maximum value, an emergency stop is executed or any other action is taken.

The robot may be operated in an automatic or a manual mode. Normally, the robot is in the automatic mode during work and in the manual mode during teaching. In an embodiment of the invention, the switching between the automatic and the manual mode could be effectuated by moving the key device from the control unit to the operating unit and vice versa. Accordingly, upon sensing the presence of the key device in the control unit, the robot is operated in the automatic mode, i.e. the robot is under automatic control, and upon sensing the presence of the key device in the operating unit, the robot is operated in the manual mode, i.e. the robot is controlled by the operating unit.

Figure 4:
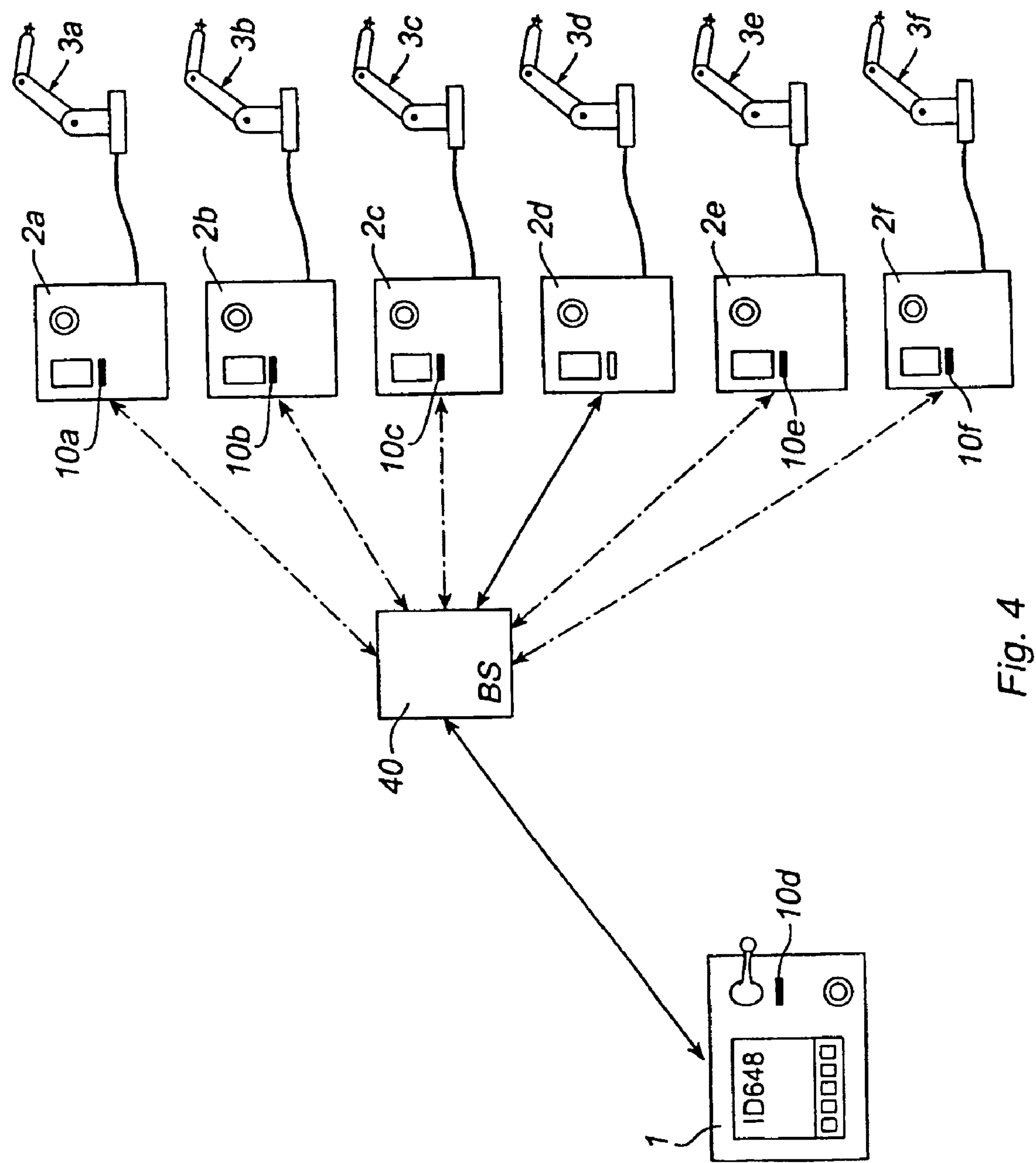
FIG. 4 shows an industrial robot system according to one embodiment of the invention, comprising an operating unit in wireless communication with the robots.

FIG. 4 shows a robot cell having six robots, each comprising a manipulator 3_a_-3_f_ and a control unit 2_a_-2_f_. Each robot can be controlled via a portable operating unit 1. The control units 2_a_-2_f_ and the operating unit 1 are adapted for being in radio communication with each other via a base station 40. For activating the operating unit 1 it needs to have the address of the base station 40 and the identity of the robot to which it shall be connected. This is done by moving the key device from the selected robot to the operating unit 1. Beside the robot identity, the hardware unit 16 comprises the address of the base station. The robot identity includes the network address of the robot to be controlled by the operating unit. The six key devices 10_a_-10_f_ have the same base station address but different robot identities. In the example shown in FIG. 4, the robot comprising controller 2_d_ is selected for being controlled by the operating unit 1. Thus, the key device 10_d_ is moved to the operating unit 1.

Each of the robots in the cell has a key device. If the cell comprises more than one operating unit 1, the key devices can be used in any of the operating units, but the control units will only accept one unique key device. The linking between a robot and an operating unit is done by use of the movable key device. Any number of operating units can be active in the cell, but the only operating unit able to manipulate the robot is the one in possession of its key device.

Upon return of the key device 10*d* to the control unit 2*d*, the operating unit 1 will send a message to the control unit informing it about the fact that the key device has been removed from the operating unit. This will stop the manipulator and start the timer in the control unit. The timer is stopped when the control unit has received the key device. If the transfer time exceeds a predetermined value, the emergency stop will be activated. If it is not possible to communicate with the control unit when the key device is removed from the operating unit, the manipulator is stopped from the moment the communication is broken, until the control unit has received the key device.

As long as the key device is not present in the control unit, the communication with the operating unit is supervised and the control unit will emergency stop the robot if the communication is broken and the key device is not returned within a predetermined time interval. The communication may be broken, for example if the operating unit leaves the radio coverage area. Thus, if the key device is still in the operating unit when the operating unit leaves the radio coverage area, the robot will be emergency stopped.

In another embodiment of the invention, the key device comprises a first part fixedly arranged in the control unit and a second movable part. The second movable part is used for message encryption and the first part is used for message decryption.

In an embodiment of the invention, the key device comprises an emergency stop button. When the key device is received by the operating unit or by the control unit, the emergency stop button is enabled and will trigger an emergency stop if activated.

The present invention is not limited to the embodiments disclosed but may be varied and modified within the scope of the following claims. For example, the means for carrying information about the identity of the robot could be implemented in a number of different ways, such as a physical key device, magnetic means, a bar-code or any other visible means. The means for reading the robot identity from the key device could for example be a mechanical, magnetic, an electromagnetic or an optical reading means. The electronic hardware device in the key device is preferably comprising a processor and software instructions.

The invention claimed is:

1. An industrial robot system, comprising:

a plurality of industrial robots, each robot comprising
 a manipulator,
 a control unit comprising means for automatically operating the manipulator,
 a movable key device configured to store information about the identity of the robot to which the moveable key device belongs, and
 a first receiving member configured to receive the movable key device of the robot to which the movable key device belongs; and a portable operating unit configured to teach and program the robots, wherein the portable operating unit is adapted for wireless communication with each control unit, and wherein the portable operating unit comprises a second receiving member configured to receive one of the moveable key devices removed from one of the first receiving members of one of the robots, a sensor configured to read a robot identity from the received moveable device, and a processor configured to establish wireless communication only between the portable operating unit and the control unit of the identified robot upon reading the robot identity from the moveable key device.

2. The industrial robot system according to claim 1, wherein the first receiving member is arranged at or connected to the control unit.

3. The industrial robot according to claim 2, wherein the control unit further comprises a timer for measuring an time elapsed between a point of time when the moveable key device is removed from the first receiving member until communication is established between the portable operating unit and the control unit.

4. The industrial robot system according to claim 3, wherein the control unit further comprises a comparison module for comparing the elapsed time with a predetermined maximum time and executing an emergency stop of the manipulator depending on the comparison.

5. The industrial robot system according to claim 2, wherein the control unit further comprises a sensor for sensing the presence of the moveable key device in the first receiving member and for enabling automatic operation of the manipulator in presence of the moveable key device.

6. The industrial robot according to claim 2, wherein the control unit further comprises means for determining whether the moveable key device received by the first receiving member carries the same identification as the robot.

7. The industrial robot system according to claim 1, wherein the portable operating unit further comprises a display for displaying the identity of the robot.

8. The industrial robot system according to claim 1, wherein the portable operating unit further comprises a sensor for sensing a presence of the moveable key device and means for enabling manual operation of the manipulator in presence of the moveable key device in the in the second receiving member of the operating unit.

9. The industrial robot system according to claim 1, further comprising:

a base station configured to carry out the communication between the portable operating unit and the control unit, wherein the movable key device is adapted for carrying information about the address of the base station.

10. The industrial robot according to claim 1, wherein the moveable key device comprises an electronic hardware device.

11. The industrial robot according to claim 10, wherein the electronic hardware device comprises a processor.

12. The industrial robot according to claim 1, wherein the movable key device comprises an emergency stop button.

13. The industrial robot according to claim 1, wherein the control unit further comprises a detector for detecting a lack of robot identity in the movable key device and means for transferring the identity of the robot to the movable key device.

14. The industrial robot according to claim 1, wherein the control unit further comprises a detector for detecting lack of robot identity in the control unit itself and means for transferring the identity of the robot from the movable key device to the control unit.

15. A portable unit for teaching and programming a plurality of industrial robots, each robot comprising a manipulator, a control unit having means for automatically operating the manipulator, a movable key device configured to store information about the identity of the robot to which the moveable key device belongs, and a first receiving member configured to receive the movable key device of the robot to which the movable key device belongs, the operating unit comprising:

a second receiving member for receiving one of the moveable key devices removed from one of the first receiving members of one of the robots;

a sensor configured to read the robot identity from the received moveable key device; and a processor configured to establish wireless communication between the portable operating unit and the control unit of only the identified robot upon reading the robot identity from the moveable key device.

16. The operating unit according to claim 15, further comprising:

a display for displaying the identity of the robot.

17. The operating unit according claim 15, further comprising:

a sensor for sensing the presence of the key device and means for enabling manual operation of the manipulator in presence of the key device in the operating unit.

18. A method for controlling a plurality of industrial robots, each robot comprising a manipulator, a control unit comprising means for automatically operating the manipulator, a movable key device configured to store information about the identity of the robot to which the moveable key device belongs, and a first receiving member configured to receive the movable key device of the robot to which the movable key device belongs, the method comprising:

moving one of the moveable key devices from one of the first receiving units of one of the robot to a second receiving unit operatively connected to the portable operating unit;

transferring said information about the robot identity from the moveable key device to the portable operating unit; and establishing a wireless communication between the operating unit and the control unit only of the identified robot when the operating unit has received the information about the robot identity.

19. The method according to claim 18, further comprising:

enabling the operation of the operating unit upon receiving the key device in the operating unit.

20. The method according to claim 18, further comprising:

measuring a time elapsed between when the movable key device is removed from the place at or in connection with the control unit until the communication is established between the operating unit and the control unit.

21. The method according to claim 18, further comprising:

checking whether the movable key device moved to a place at or in connection with the control unit carries the same identification as the robot connected to the control unit.

22. The method according to claim 18, the industrial robots are arranged at a spot welding station, the method further comprising:

controlling operation of the robots at the spot welding station.

* * * * *